(12) United States Patent
Mondshine et al.

(10) Patent No.: US 8,051,280 B2
(45) Date of Patent: *Nov. 1, 2011

(54) OPERATING ENVIRONMENT CONFIGURATION SYSTEM AND METHOD

(75) Inventors: James L. Mondshine, Cypress, TX (US); William Caldwell Crosswy, The Woodlands, TX (US); Christopher W. Larsen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

This patent is subject to a terminal disclaimer.

(21) Appl. No.: 12/322,393

(22) Filed: Feb. 2, 2009

(65) Prior Publication Data

US 2009/0144530 A1   Jun. 4, 2009

Related U.S. Application Data

(63) Continuation of application No. 11/238,465, filed on Sep. 29, 2005, now Pat. No. 7,500,090.

(51) Int. Cl.
*G06F 15/177* (2006.01)

(52) U.S. Cl. .................. 713/1; 713/2; 713/100

(58) Field of Classification Search .................. None
See application file for complete search history.

(56) References Cited

U.S. PATENT DOCUMENTS

| 6,161,176 | A | 12/2000 | Hunter et al. |
| 6,393,560 | B1 * | 5/2002 | Merrill et al. ................. 713/2 |
| 6,763,458 | B1 | 7/2004 | Watanabe et al. |
| 2004/0243997 | A1 * | 12/2004 | Mullen et al. ............... 717/174 |
| 2005/0114682 | A1 * | 5/2005 | Zimmer et al. .............. 713/187 |
| 2006/0085630 | A1 * | 4/2006 | Challener et al. .............. 713/2 |

OTHER PUBLICATIONS

European Patent Office Communication pursuant to Article 94(3) EPC from co-pending parent Application No. 06 787 479.2-2211 having a date of mailing of Jan. 13, 2009.
European Patent Office, Communication pursuant to Article 94(3) EPC, Appln. No. 06787479.2, date of mailing Apr. 20, 2011, pp. 6.

* cited by examiner

*Primary Examiner* — Dennis M Butler

(57) ABSTRACT

An operating environment configuration system comprises a first operating system of a computer device having at least one configuration setting associated therewith, and a second operating system of the computer device configured to automatically retrieve the at least one configuration setting and configure at least one component associated with the second operating system with the at least one configuration setting.

11 Claims, 3 Drawing Sheets

OPERATING ENVIRONMENT CONFIGURATION SYSTEM AND METHOD

CROSS-REFERENCE TO RELATED APPLICATIONS

This is a continuation of U.S. patent application Ser. No. 11/238,465 entitled "OPERATING ENVIRONMENT CONFIGURATION SYSTEM AND METHOD," filed Sep. 29, 2005, now U.S. Pat. No. 7,500,090.

BACKGROUND OF THE INVENTION

Computer devices are configurable to have multiple operating environments or systems. For example, computer devices are configurable to have what may be considered a primary operating system, such as a WINDOWS operating system, and a secondary operating system, such as a LINUX or other type of operating system. To provide networking capabilities and/or other system settings in the secondary operating system, a software interface is utilized by a user to configure various components and/or settings in the secondary operating system. However, to utilize such software interface, the user must understand how to configure, setup and maintain such settings in the secondary environment. Further, such software interface must be developed and maintained. Additionally, synchronization issues may arise if changes are made to any of the operating systems.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
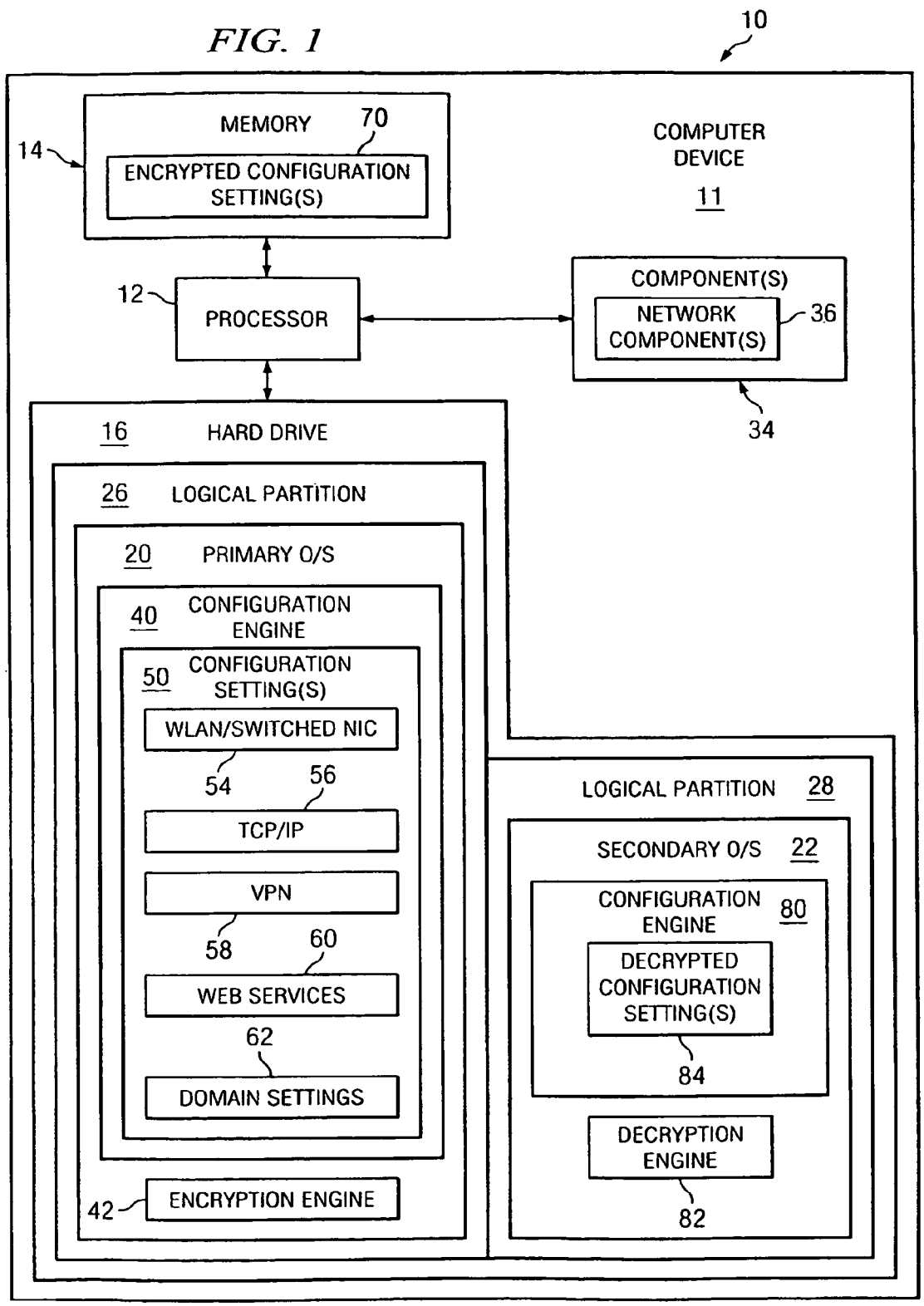
FIG. 1 is a diagram illustrating an embodiment of an operating environment configuration system in accordance with the present invention.
Figure 2:
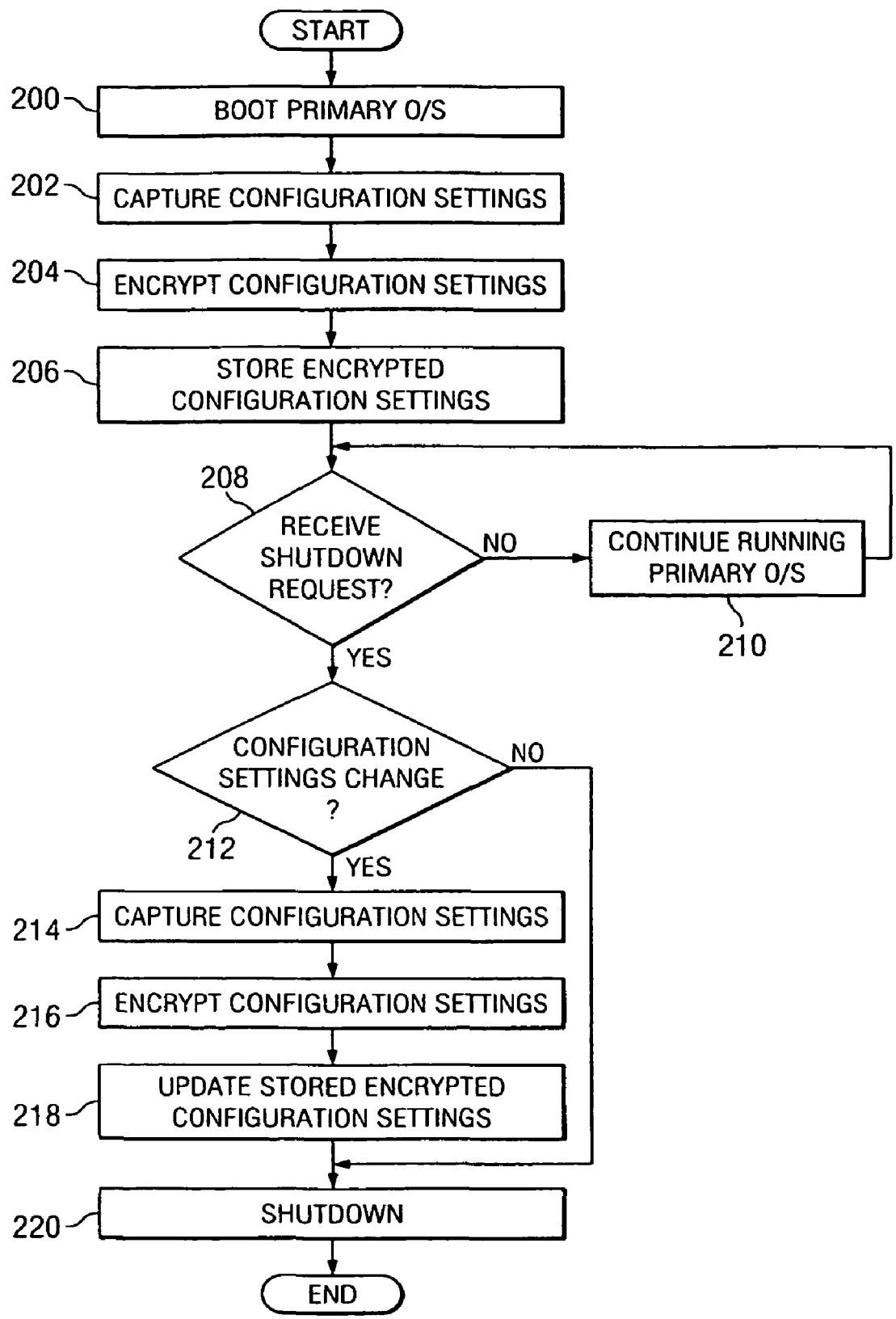
FIG. 2 is a flow diagram illustrating an embodiment of an operating environment configuration method in accordance with the present invention.
Figure 3:
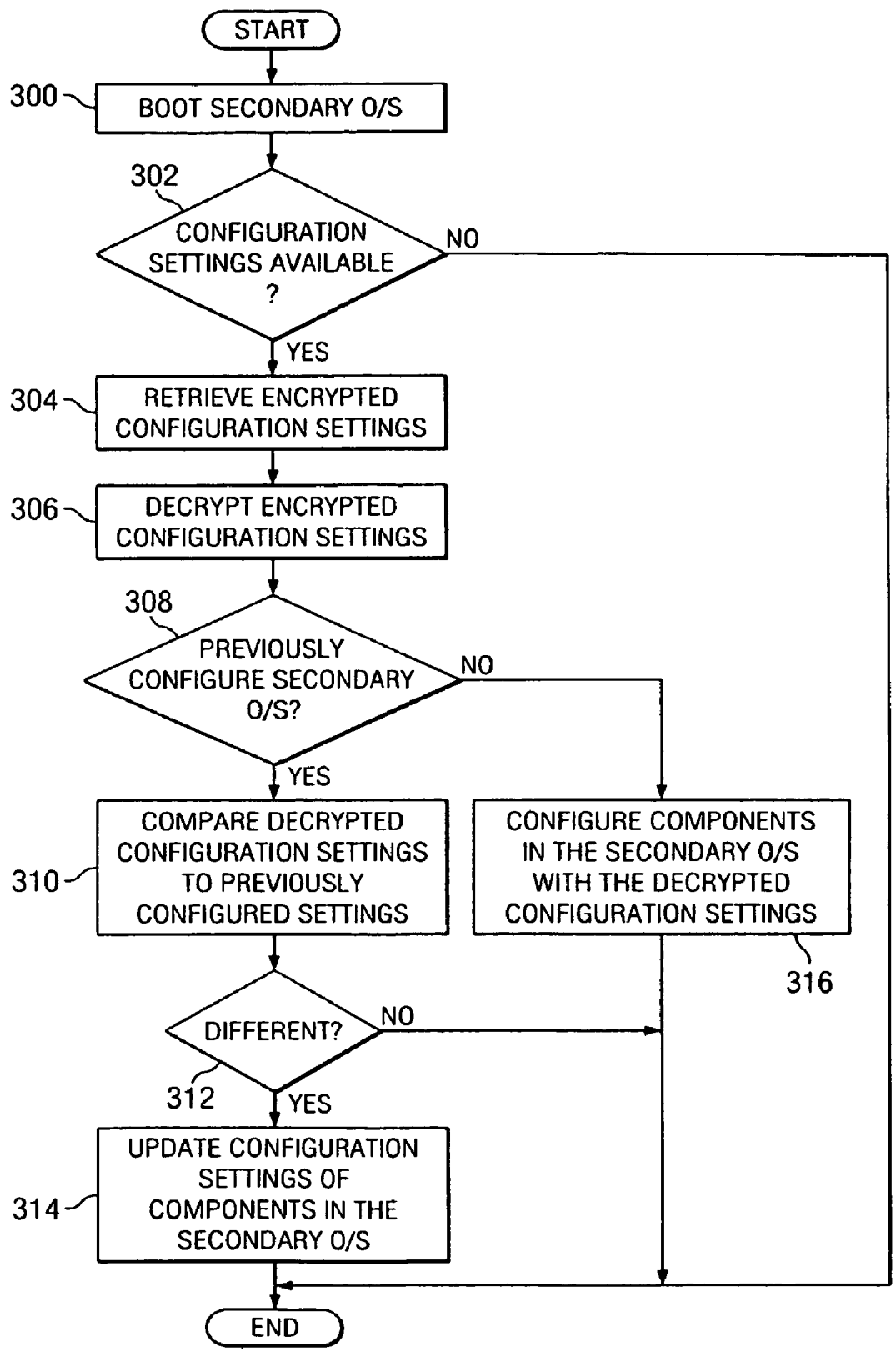
FIG. 3 is a flow diagram illustrating another embodiment of an operating environment configuration method in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of an operating environment configuration system 10 for a computer device 11 in accordance with the present invention. Computer device 11 may comprise any type of computer device such as, but not limited to, a desktop computer, laptop or notebook computer, workstation, personal digital assistant, tablet personal computer, and/or handheld computing devices. In the embodiment illustrated in FIG. 1, system 10 comprises a processor 12 coupled to a memory 14. In the embodiment illustrated in FIG. 1, processor 12 is coupled to a hard drive 16 having a first or primary operating system 20 and a second or secondary operating system 22 stored thereon. However, it should be understood that primary operating system 20 and secondary operating system 22 may be stored elsewhere. Further, in the embodiment illustrated in FIG. 1, two operating systems 20 and 22 are illustrated; however, it should be understood that system 10 may be configured having a greater number of operating systems. Operating systems 20 and 22 may comprise different operating systems or platforms and/or may comprise different instances of the same operating system or platform. Further, as used herein, "first," "second," "primary" and "secondary" are used only to differentiate between different operating systems and/or different instances of a single operating system as it should be understood that either operating system 20 or operating system 22 may be configured as a preferred and/or default operating system. Preferably, computer device 10 is configured to enable switching between different operating systems (e.g., from operating system 20 to operating system 22, or vice versa) and/or switching between different modes of use where each mode perhaps uses a different operating system (e.g., operating system 20 for a notebook mode and operating system 22 for a tablet mode).

In the embodiment illustrated in FIG. 1, primary operating system 20 and secondary operating system 22 are disposed on different logical partitions of hard drive 16. For example, primary operating system 20 is illustrated as being disposed on a logical partition 26 of hard drive 16, and secondary operating system 22 is illustrated as being disposed on a logical partition 28 of hard drive 16. However, it should be understood that primary operating system 20 and secondary operating system 22 may be stored on separate hard drives. Additionally, in the embodiment illustrated in FIG. 1, memory 14 is illustrated as being separate and/or apart from hard drive 16 (e.g., on a motherboard or elsewhere). However, it should be understood that memory 14 may comprise a portion of hard drive 16 (e.g., a portion of either logical partition 26 or logical partition 28).

In the embodiment illustrated in FIG. 1, system 10 comprises component(s) 34 used in association with primary operating system 20 such as, but not limited to, hardware, software and/or a combination thereof. For example, component(s) 34 may comprise audio component(s), video component(s), and/or various software applications (e.g., an e-mail application). In the embodiment illustrated in FIG. 1, component(s) 34 comprise network component(s) 36 for communicatively coupling system 10 to a network such as, but not limited to, a wide area network (WAN), local area network (LAN), the Internet, an intranet, or other local or remote network. It should be understood that component(s) 34 may be associated and/or otherwise configured for use with either primary operating system 20 or secondary operating system 22. In the embodiment illustrated in FIG. 1, primary operating system 20 comprises a configuration engine 40 and an encryption engine 42. Configuration engine 40 and encryption engine 42 may comprise hardware, software, or a combination of hardware and software. In the embodiment illustrated in FIG. 1, configuration engine 40 and encryption engine 42 are illustrated as comprising a portion of primary operating system 20. However, it should be understood that configuration engine 40 and/or encryption engine 42 may be otherwise configured and/or located.

In operation, configuration engine 40 is adapted to capture and/or otherwise store configuration setting(s) 50 used in association with primary operating system 20 (e.g., either automatically or in response to a user request). For example, in some embodiments of the present invention, configuration engine 40 is adapted to capture and/or otherwise store configuration setting(s) 50 for network component(s) 36 used in association with primary operating system 20. In the embodiment illustrated in FIG. 1, configuration setting(s) 50 comprise a wireless local are network (WLAN)/switched network interface card (NIC) setting 54, a transmission control protocol/Internet protocol (TCP/IP) setting 56, a virtual private network (VPN) setting 58, web service(s) setting(s) 60, and domain setting(s) 62. However, it should be understood that additional or alternative network configuration setting(s) 50 may be captured and/or stored. Further, it should be understood that other types of configuration setting(s) 50 associated with primary operating system 20 besides network-related settings may be captured and/or stored by configuration engine 40 such as, but not limited to video settings (e.g., resolution, color depth and external monitor settings), audio settings (e.g., volume, mixer, etc.), e-mail client information (e.g., e-mail server information, account name and password), location, format, and credentials of data files such as a contact list or calendar/meeting schedules, location, format and credentials to access audio/video content or playlists, and/or user credentials to enable a user to run diagnostics or a virus scan on a primary drive from utilities on a secondary drive (e.g., stored in a secure location that is inaccessible or invisible to potentially threatening software on the primary drive). Preferably, configuration engine 40 is configured to automatically capture and/or otherwise store configuration setting(s) 50 associated with primary operating system 20 at a predetermined time and/or interval. For example, in some embodiments of the present invention, configuration engine 40 is configured to automatically capture and/or store configuration setting(s) 50 in response to primary operating system 20 receiving a shutdown request. However, it should be understood that configuration engine 40 may be configured to capture and/or store configuration setting(s) 50 at other times and/or in response to a user request.

Configuration engine 40 stores configuration setting(s) 50 in a predetermined format in memory 14. Preferably, memory 14 comprises a shared memory space accessible by operating systems 20 and 22 to facilitate storage of configuration setting(s) 50 thereto by operating system 20 and access thereto by operating system 22. As described above, in the embodiment illustrated in FIG. 1, memory 14 is illustrated as being separate and/or apart from hard drive 16 (e.g., on a motherboard or elsewhere). However, it should be understood that memory 14 may comprise a portion of hard drive 16 or any other type of memory element (e.g., a portion of logical partition 28 accessible by operating system 22, a portion logical partition 28 accessible by operating system 20, a portion of logical partition 26 accessible by operating system 20, a portion of logical partition 26 accessible by operating system 22, another logical partition of hard drive 16 accessible to both operating systems 20 and 22, flash read-only memory (ROM), or any non-volatile storage device or memory element). Additionally, because configuration setting(s) 50 may comprise sensitive information (e.g., authentication information, passwords, etc.), configuration setting(s) 50 are preferably stored in memory 14 in a secured format. Thus, in the embodiment illustrated in FIG. 1, encryption engine 42 is used to encrypt and/or otherwise securely format configuration setting(s) 50 to ensure secure access thereto. Configuration engine 40 is adapted to store the encrypted configuration setting(s), indicated by 70 and FIG. 1, in memory 14. Further, it should be understood that in some embodiments of the present invention, encryption engine 42 is configured to also decrypt data received and/or otherwise accessed thereby in an encrypted format.

In the embodiment illustrated in FIG. 1, secondary operating system 22 comprises a configuration engine 80 and a decryption engine 82. Configuration engine 80 and decryption engine 82 may comprise hardware, software, or a combination of hardware and software. In the embodiment illustrated in FIG. 1, configuration engine 80 and decryption engine 82 are illustrated as comprising a portion of secondary operating system 22. However, it should be understood that configuration engine 80 and/or decryption engine 82 may be otherwise configured and/or located.

In operation, configuration engine 80 is configured to obtain and/or retrieve configuration setting(s) 50 associated with primary operating system 20 and apply and/or otherwise configure corresponding component(s) 34 (e.g., hardware, software or a combination thereof) used in connection with secondary operating system 22 with configuration setting(s) 50 (e.g., either automatically or in response to a user request). For example, in some embodiments of the present invention, configuration engine 80 is configured to obtain and/or retrieve configuration setting(s) 50 associated with network component(s) 36 used in association with primary operating system 20 and apply and/or otherwise configure such network component(s) 36 with configuration setting(s) 50 for use with secondary operating system 22. However, it should be understood that other types of configuration setting(s) 50 besides network-related settings may be obtained and automatically applied to secondary operating system 22 for various types of component(s) 34. In the embodiment illustrated in FIG. 1, configuration engine 80 is adapted to retrieve encrypted configuration setting(s) 70 from memory 14. Decryption engine 82 is configured to decrypt the encrypted configuration setting(s) 70 such that configuration engine 80 uses the decrypted configuration setting(s), indicated by 84 in FIG. 1, to configure component(s) 34 used in association with secondary operating system 22. It should also be understood that in some embodiments of the present invention, decryption engine 82 is configured to also encrypt data desired to be in an encrypted format.

Preferably, configuration engine 80 is configured to automatically determine the availability of configuration setting(s) 50 (e.g., in the form of encrypted configuration setting(s) 70 or otherwise) for configuring component(s) 34 associated with secondary operating system 22. For example, in some embodiments of the present invention, configuration engine 80 is configured to automatically access and/or check memory 14 for the existence of a file containing configuration setting(s) 50 (e.g., in the form of encrypted configuration setting(s) 70 or otherwise). Further, configuration engine 80 is preferably configured to automatically check and/or verify the availability of configuration setting(s) 50 to apply with secondary operating system 22 in response to booting of secondary operating system 22 to facilitate synchronization of configuration settings between primary operating system 20 and secondary operating system 22. However, it should be understood that configuration engine 80 may be otherwise configured to retrieve and/or otherwise apply such configuration settings (e.g., at a predetermined time, predetermined interval and/or in response to a user request).

In some embodiments of the present invention, configuration engine 80 is adapted to compare the configuration settings retrieved from memory 14 and associated with primary operating system 20 with configuration settings previously retrieved, stored and/or otherwise applied in secondary operating system 22. For example, in some embodiments of the present invention, after retrieving encrypted configuration setting(s) 70 and generating decrypted configuration setting(s) 84, configuration engine 80 is adapted to compare the decrypted configuration setting(s) 84 with configuration settings previously applied in secondary operating system 22 based on a prior retrieval of encrypted configuration setting(s) 70 from memory 14, a user-configured setting of secondary operating system 22, or otherwise. Preferably, configuration engine 80 is configured to automatically update the configuration settings for secondary operating system 22 based on most-recently retrieved configuration settings from memory 14 to facilitate synchronization between primary operating system 20 and secondary operating system 22. However, configuration engine 80 may be otherwise configured. For example, in some embodiments of the present invention, configuration engine 80 is configured to automatically apply configuration setting(s) 84 upon retrieval of such setting(s) 84 without comparing such setting(s) 84 to previous settings. Alternatively, or additionally, in some embodiments of the present invention, configuration engine 80 is configured to compare setting(s) 84 at a particular time (e.g., only upon booting of a particular operating system).

FIG. 2 is a flow diagram illustrating an embodiment of an operating environment configuration method in accordance with the present invention. In the embodiment illustrated in FIG. 2, the method begins at block 200, where primary operating system 20 is booted. At block 202, configuration engine 40 of primary operating system 20 captures configuration setting(s) 50 used in connection with primary operating system 20. At block 204, encryption engine 42 encrypts configuration setting(s) 50 captured by configuration engine 40. At block 206, configuration engine 40 stores the configuration setting(s) 50 in memory 14 as encrypted configuration setting(s) 70.

At decisional block 208, a determination is made whether primary operating system 20 has received a shutdown request. If primary operating system 20 has not received a shutdown request, the method proceeds to block 210, where primary operating system 20 continues running and/or operating. If at block 208 a determination is made that a shutdown request was received, the method proceeds to decisional block 212, where a determination is made whether configuration setting(s) 50 have changed from the configuration settings captured at block 202. If configuration setting(s) 50 have changed from the settings captured at block 202, the method proceeds to block 214, where configuration engine 40 captures the current configuration setting(s) 50 associated with primary operating system 20. At block 216, encryption engine 42 encrypts the configuration setting(s) 50 captured at block 214. At block 218, configuration engine 40 stores the encrypted configuration setting(s) 70 in memory 14 (e.g., replaces and/or updates previously stored setting(s) 70). The method proceeds to block 220, where primary operating system 20 shuts down. At decisional block 212, if the configuration setting(s) 50 captured at block 202 have not changed, the method proceeds to block 220.

FIG. 3 is a flow diagram illustrating another embodiment of an operating environment configuration method in accordance with the present invention. In the embodiment illustrated in FIG. 3, the method begins at block 300, where secondary operating system 22 is booted. At decisional block 302, configuration engine 80 determines whether configuration settings are available for configuring and/or otherwise applying with secondary operating system 22. For example, in some embodiments of the present invention, configuration engine 80 accesses memory 14 to determine whether a file is present within memory 14 containing configuration setting(s) 50 (e.g., in the form of encrypted configuration setting(s) 70 or otherwise) associated with primary operating system 20. If configuration settings are available, the method proceeds to block 304, where configuration engine 80 retrieves encrypted configuration setting(s) 70 from memory 14. At block 306, decryption engine 82 decrypts the encrypted configuration setting(s) 70, thereby resulting in decrypted configuration setting(s) 84 (FIG. 1).

At decisional block 308, a determination is made whether component(s) and/or application(s) associated with secondary operating system 22 have been previously configured. If component(s) and/or application(s) associated with secondary operating system 22 have not been previously configured, the method proceeds to block 316. If component(s) and/or application(s) associated with secondary operating system 22 have been previously configured, the method proceeds to block 310, where configuration engine 80 compares decrypted configuration setting(s) 84 with settings previously configured and/or applied in secondary operating system 22. At decisional block 312, a determination is made whether the decrypted configuration setting(s) 84 are different than previously configured settings associated with secondary operating system 22. If the settings are not different, the method ends. If the settings are different, the method proceeds to block 314, where configuration engine 80 updates the configuration settings associated with secondary operating system 22 using the configuration settings retrieved at block 304. The method then ends.

Thus, embodiments of the present invention enable automatic configuring of secondary or alternate operating environments. Further, embodiments of the present invention maintain synchronization between different operating environments. It should be understood that in the described methods, certain steps may be omitted, accomplished in a sequence different from that depicted in FIGS. 2 and 3, or performed simultaneously. Also, it should be understood that the methods depicted in FIGS. 2 and 3 may be altered to encompass any of the other features or aspects of the invention as described elsewhere in the specification.

Further, embodiments of the present invention may be implemented in software and can be adapted to run on different platforms and operating systems. In particular, functions implemented by configuration engines 40 and/or 80, encryption engine and/or decryption engine 82 may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium.

What is claimed is:

1. A computer-readable storage medium having stored thereon an instruction set to be executed, the instruction set, when executed by a processor, causing the processor to:
   cause a first operating system of a dual-booting computer device to automatically retrieve at least one configuration setting associated with a second operating system of the dual-booting computer device;
   compare, by the first operating system, the at least one configuration setting with a previous configuration setting associated with at least one component used in association with the first operating system; and
   configure the at least one component associated with the first operating system with the at least one configuration setting associated with the second operating system.

2. The computer-readable storage medium of claim 1, wherein the instruction set, when executed by the processor, causes an encryption engine to encrypt the at least one configuration setting.

3. The computer-readable storage medium of claim 1, wherein the instruction set, when executed by the processor, causes a configuration engine to determine availability of the at least one configuration setting.

4. The computer-readable storage medium of claim 1, wherein the instruction set, when executed by the processor, causes a decryption engine to decrypt an encrypted format of the at least one configuration setting.

5. The computer-readable storage medium of claim 1, wherein the configuring is in response to the comparing.

6. A computer device comprising:
    a first operating system and a second operating system to provide a dual-booting computer device, the first and second operating systems being stored in a computer-readable medium within the computer device;
    the first operating system configured to automatically retrieve at least one configuration setting associated with the second operating system of the dual-booting computer device;
    the first operating system further configured to compare the at least one configuration setting with a previous configuration setting associated with at least one component; and
    the computer device being configured to transform the at least one component associated with the first operating system by re-configuring the at least one component associated with the first operating system with the at least one configuration setting.

7. The computer device of claim 6 further comprising a computer-readable medium that stores the at least one configuration setting associated with the second operating system.

8. The computer device of claim 6, wherein the re-configuring is responsive to the comparing.

9. A computer-readable storage medium having stored thereon an instruction set to be executed, the instruction set, when executed by a processor, causing the processor to:
    cause a configuration engine of a computer device having a first operating system and a second operating system to automatically retrieve at least one configuration setting associated with the second operating system of the computer device;
    cause the configuration engine to compare the at least one configuration setting with a previous configuration setting associated with at least one component; and
    cause the configuration engine to configure the at least one component associated with the first operating system with the at least one configuration setting.

10. The computer-readable storage medium of claim 9, wherein the configuration engine is part of the first operating system.

11. The computer-readable storage medium of claim 9, wherein the configuring is in response to the comparing.

* * * * *